(12) United States Patent
Togashi

(10) Patent No.: US 10,097,713 B2
(45) Date of Patent: Oct. 9, 2018

(54) IMAGE READING APPARATUS EQUIPPED WITH ORIGINAL-SIZE-DETECTION FUNCTION AND IMAGE FORMING APPARATUS EQUIPPED WITH IMAGE READING APPARATUS

(71) Applicant: CANON KABUSHIKI KAISHA, Tokyo (JP)

(72) Inventor: Kazunori Togashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/591,613

(22) Filed: May 10, 2017

(65) Prior Publication Data

US 2017/0331968 A1  Nov. 16, 2017

(30) Foreign Application Priority Data

May 16, 2016  (JP) ................................. 2016-098040

(51) Int. Cl.
*H04N 1/04* (2006.01)
*H04N 1/00* (2006.01)
*H04N 1/028* (2006.01)

(52) U.S. Cl.
CPC ..... *H04N 1/00713* (2013.01); *H04N 1/00037* (2013.01); *H04N 1/00737* (2013.01); *H04N 1/00774* (2013.01); *H04N 1/00798* (2013.01); *H04N 1/02845* (2013.01); *H04N 2201/0081* (2013.01)

(58) Field of Classification Search
CPC ........... H04N 1/00037; H04N 1/00689; H04N 1/00551; F21V 14/04; F21V 17/02; F21V 1/10; F21V 23/0435; F21W 2121/00; F27B 17/0016

USPC .............. 358/509, 475, 521, 530, 537, 538; 348/211.99, 302
See application file for complete search history.

(56) References Cited

U.S. PATENT DOCUMENTS

| 5,079,624 | A * | 1/1992 | Sasuga ..................... H04N 1/60 358/521 |
| 9,369,602 | B2 * | 6/2016 | Mutsuo ..................... H04N 1/04 |
| 9,706,070 | B2 * | 7/2017 | Morikawa ........... H04N 1/00771 |
| 9,826,179 | B2 * | 11/2017 | Shima .................. H04N 5/3575 |

(Continued)

FOREIGN PATENT DOCUMENTS

JP  2013026657 A  2/2013

*Primary Examiner* — Negussie Worku
(74) *Attorney, Agent, or Firm* — Rossi, Kimms & McDowell LLP

(57) ABSTRACT

An image reading apparatus is capable of reducing glare that a user feels while PWM-controlling an LED and of detecting an original size in a principal scanning direction with sufficient accuracy. A line sensor receives light emitted from a light source and reflected by an original. When a pressure plate that presses an original to a platen is closed, a control unit controls to supply a line periodic signal of which a period is longer than that for reading an original image to the line sensor, and to supply a lighting control signal of which a duty ratio is smaller than that for reading the original image to the light source in synchronization with the line periodic signal to light the light source and to read an image, and controls to detect length of the original in the principal scanning direction using the image signals from the line sensor.

6 Claims, 8 Drawing Sheets

(56) References Cited

U.S. PATENT DOCUMENTS

| | | | |
|---|---|---|---|
| 2012/0026559 A1* | 2/2012 | Katsuda | G03G 15/607 358/475 |
| 2014/0186026 A1* | 7/2014 | Oshima | H04B 10/116 398/25 |
| 2015/0244891 A1* | 8/2015 | Togashi | H04N 1/484 358/509 |
| 2016/0269581 A1* | 9/2016 | Matsunami | H04N 1/00557 |
| 2017/0034386 A1* | 2/2017 | Kusuhata | H04N 1/00684 |
| 2017/0070619 A1* | 3/2017 | Hamada | H04N 1/00076 |
| 2017/0094113 A1* | 3/2017 | Togashi | H03M 1/1245 |
| 2017/0155796 A1* | 6/2017 | Watanabe | H04N 1/00748 |
| 2017/0171478 A1* | 6/2017 | Sano | H04N 1/031 |
| 2017/0187920 A1* | 6/2017 | Suzuki | H04N 1/40056 |
| 2017/0251152 A1* | 8/2017 | Shima | H04N 5/3575 |
| 2017/0257495 A1* | 9/2017 | Kanaya | H04N 1/00013 |
| 2017/0318212 A1* | 11/2017 | Oshima | G06Q 30/0246 |
| 2017/0327331 A1* | 11/2017 | Nakashima | B65H 5/26 |
| 2017/0353623 A1* | 12/2017 | Ono | H04N 1/00037 |

* cited by examiner

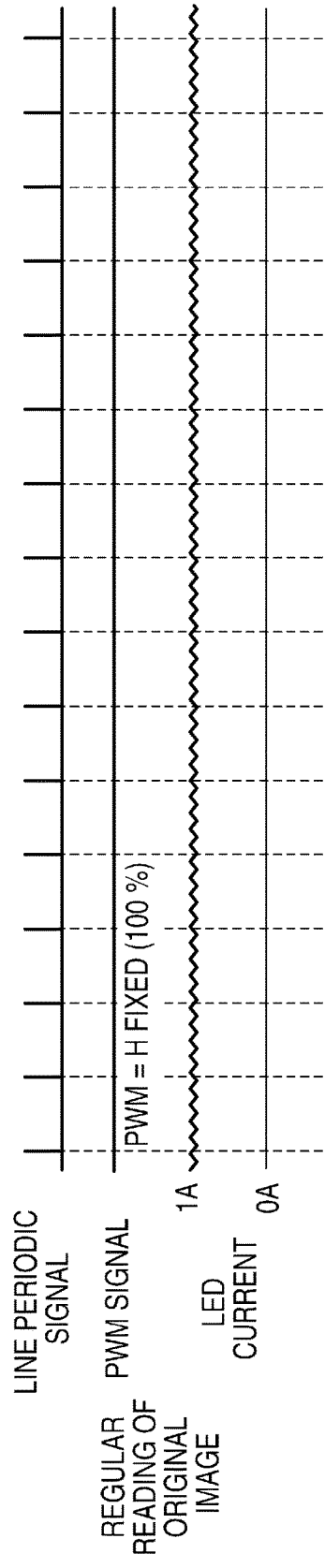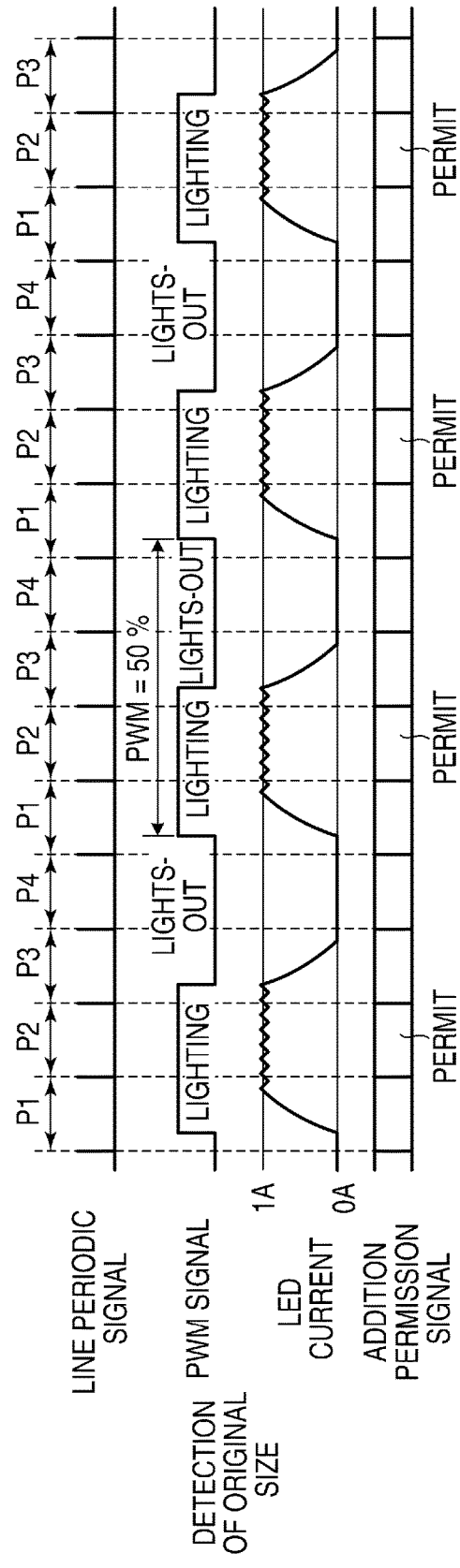

IMAGE READING APPARATUS EQUIPPED WITH ORIGINAL-SIZE-DETECTION FUNCTION AND IMAGE FORMING APPARATUS EQUIPPED WITH IMAGE READING APPARATUS

BACKGROUND OF THE INVENTION

Field of the Invention

The present invention relates to an image reading apparatus equipped with an original-size-detection function using a line sensor that reads an original, and an image forming apparatus equipped with the image reading apparatus.

Description of the Related Art

There are two methods for detecting a size of an original placed on a platen glass of an image reading apparatus in a principal scanning direction. One uses a dedicated sensor, and the other uses a line sensor that reads an original. A size of an original in the principal scanning direction is detected with using the line sensor at a timing that a user closes a platen cover or a pressure plate provided in a lower side of an automatic document feeder (ADF), for example.

The pressure plate closely fits an original to the platen glass. When it is detected that the user closes the pressure plate, a light source lights and reflected light is read, and brightness read in a principal scanning area in which the original exists and brightness read in a principal scanning area in which the original does not exist are detected. Then, an end of the original in the principal scanning direction is detected on the basis of difference between the brightnesses read, and the size of the original in the principal scanning direction is detected according to the end position in the principal scanning direction.

Since the method of using a line sensor enables to detect an original size, without using a dedicated sensor, it is advantageous in respect of cost. However, if the light source lights and an original size is read before the pressure plate is fully closed, irradiating light goes into a user's eye and there is a problem that the user feels glare.

There is a technique that controls the light source so that an irradiation light amount at a time of detection of an original size in the principal scanning direction is smaller than that at a time of reading of an original image in order to reduce glare that the user feels. For example, when a white light emitting diode (hereinafter, referred to as an "LED") is used as a light source for illumination, the irradiation light amount is decreased by reducing the current amount applied to the LED. As a result of this, the glare that the user feels at the time of detection of an original size is reduced.

Japanese Laid-Open Patent Publication (Kokai) No. 2013-026657 (JP 2013-026657A) discloses an image reading apparatus that detects the original size in the principal scanning direction with using an LED as a light source at an irradiation light amount that is smaller than that of reading an original image. The image reading apparatus disclosed in this publication PWM-controls the LED to adjust the irradiation light amount of the LED by changing duty ratio of a PWM signal that controls lighting of the LED. The PWM signal is outputted in synchronization with a line periodic signal to a line sensor, and the PWM signal is outputted multiple times within the period of the line periodic signal.

However, when large electric current that is 1 ampere or more is applied to the LED as a light source in the image reading apparatus disclosed in the above-mentioned publication, the rise of the electric current at a time of lighting and the fall of the electric current at a time of lights-out need time, which makes a high-speed PWM lighting control be difficult. Moreover, when a circuit of a type of a DC-DC converter is used to control the electric current to the LED, an inductor with large capacity is used or a capacitor is added to a LED current line in order to reduce a large ripple that occurs in LED current. Since the rise time and fall time of the LED current become long, a high-speed PWM lighting control becomes more difficult.

Moreover, since the period of the line periodic signal for the line sensor becomes short in a reading apparatus of which an original reading speed is fast, the PWM lighting period cannot be included within the period of the line periodic signal when the PWM signal is outputted multiple times within the period of the line periodic signal as described in the above-mentioned publication. As a result, since the LED current that flows within the period of the line periodic signal varies, the LED current amount differs for every line period signal, an accurate read original image is not obtained, which degrades accuracy in detection of the original size in the principal scanning direction.

SUMMARY OF THE INVENTION

The present invention provides an image reading apparatus and an image forming apparatus that are capable of reducing glare that a user feels while PWM-controlling an LED as a light source and of detecting an original size in a principal scanning direction with sufficient accuracy.

Accordingly, a first aspect of the present invention provides an image reading apparatus including an opening-closing detection unit configured to detect an opening/closing state of a pressure plate that presses an original to a platen, a light source that irradiates the original placed on the platen with light, a lighting unit configured to light said light source, a reading unit configured to receive light that is emitted from said light source and is reflected by the original with a line sensor to read an image, and to output image signals, a signal generating unit configured to output a lighting control signal that is supplied to said lighting unit in synchronization with a line periodic signal supplied to the line sensor, a length detection unit configured to detect the length of the original in a principal scanning direction based on the image signals output from said reading unit, and a control unit configured to control said signal generating unit to supply a line periodic signal of which a period is longer than a period of a line periodic signal at a time of reading an original image to the line sensor, and to supply a lighting control signal of which a duty ratio is smaller than a duty ratio at the time of reading the original image to said lighting unit in synchronization with the line periodic signal to light said light source and to read an image with said reading unit, and to control said length detection unit to detect the length of the original in the principal scanning direction using the image signals output from said reading unit, when said opening-closing detection unit detects that the pressure plate is closed to a predetermined angle.

Accordingly, a second aspect of the present invention provides an image reading apparatus including an opening-closing detection unit configured to detect an opening/closing state of a pressure plate that presses an original to a platen, a light source that irradiates the original placed on the platen with light, a lighting unit configured to light said light source, a reading unit configured to receive light that is emitted from said light source and is reflected by the original with a line sensor to read an image, and to output image signals, a signal generating unit configured to output a lighting control signal that is supplied to said lighting unit in synchronization with a line periodic signal supplied to the line sensor, a signal determination unit configured to receive the line periodic signal and the lighting control signal, and to determine an output logic level of the lighting control signal within a period of the line periodic signal, a length detection unit configured to detect the length of the original in a principal scanning direction based on the image signals output from said reading unit, and a control unit configured to control said signal generating unit to supply a lighting control signal of which a duty ratio is smaller than a duty ratio at a time of reading an original image to said lighting unit in synchronization with a plurality of line periodic signals to light said light source so as to generate a line periodic signal period during which constant electric current flows, to control said reading unit to read an image, and to control said length detection unit to detect the length of the original in the principal scanning direction using image signals corresponding to an image read by said reading unit within the line periodic signal period based on a determination result of said signal determination unit, when said opening-closing detection unit detects that the pressure plate is closed to a predetermined angle.

Accordingly, a third aspect of the present invention provides an image forming apparatus including the image reading apparatus of the first aspect and a printing apparatus that prints an image read by the image reading apparatus.

Accordingly, a fourth aspect of the present invention provides an image forming apparatus including the image reading apparatus of the second aspect and a printing apparatus that prints an image read by the image reading apparatus.

According to the present invention, when the original size in the principal scanning direction is detected, the period of the line periodic signal is made longer than that at the time of reading of an original image, and the light-source lighting control signal of which the duty ratio is made smaller than that at the time of reading of the original image is supplied so as to be constant for every period of the line periodic signal. Moreover, the constant electric current is sent by supplying the light-source lighting control signal of which the duty ratio is made smaller than that at the time of reading of an original image, and the image data required for detecting the original size in the principal scanning direction is obtained when the line periodic signal at the time of lighting the light source is recognized. This enables to detect the original size in the principal scanning direction with the sufficient accuracy while reducing the glare that a user feels.

Further features of the present invention will become apparent from the following description of exemplary embodiments with reference to the attached drawings.

BRIEF DESCRIPTION OF THE DRAWINGS

FIG. 8A and FIG. 8B are timing charts showing various signals and electric currents in the second embodiment.

DESCRIPTION OF THE EMBODIMENTS

Hereafter, embodiments according to the present invention will be described in detail with reference to the drawings.

Figure 1A:
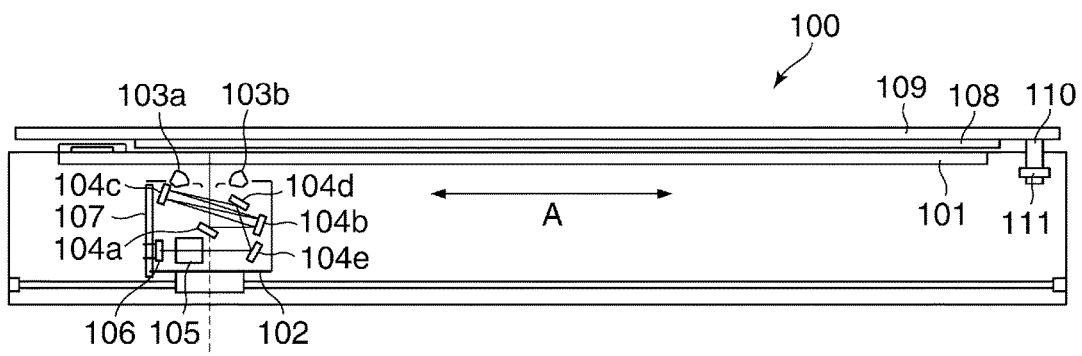
FIG. 1A is a longitudinal sectional view schematically showing a configuration of an image reading apparatus according to a first embodiment of the present invention.
Figure 1B:
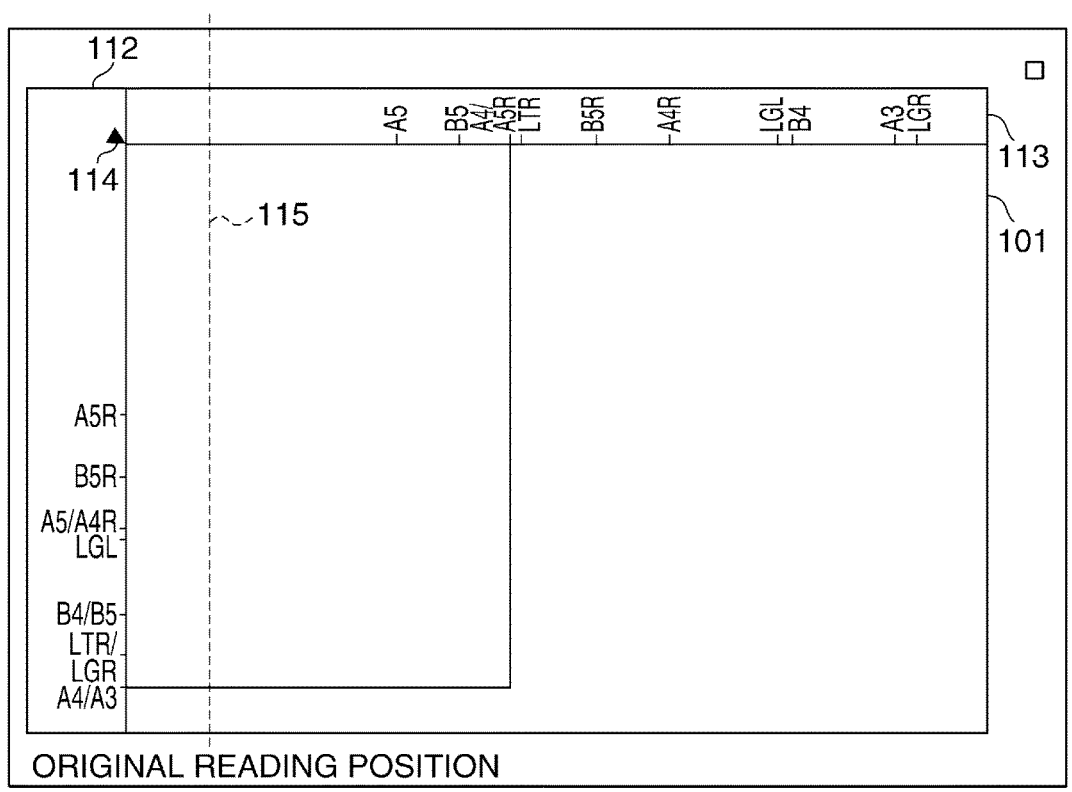
FIG. 1B is a plan view showing a platen of the image reading apparatus shown in FIG. 1A.

FIG. 1A is a longitudinal sectional view schematically showing a configuration of an image reading apparatus according to a first embodiment of the present invention, and FIG. 1B is a plan view showing a platen of the image reading apparatus shown in FIG. 1A. The image reading apparatus 100 may constitute a part of an image forming apparatus that prints an image read with the image reading apparatus 100 concerned.

As shown in FIG. 1A, the image reading apparatus 100 is provided with a platen glass 101 as a platen on which an original is placed, a pressure plate 109 that opens and closes the surface of the platen glass 101, an original pressing plate 108 fixed to the back of the pressure plate 109, and an optical box 102.

The optical box 102 is arranged in a lower space of the platen glass 101, and is configured to be movable along an arrow A in FIG. 1A. Elements of a reduction optical system are arranged in the optical box 102. That is, lighting units 103a and 103b that irradiate an original placed on the platen glass 101 are arranged at the upper portion of the optical box 102. Folding mirrors 104a, 104b, 104c, 104d, and 104e are arranged under the lighting units 103a and 103b. An image forming lens 105 is arranged so as to face the folding mirror 104e. Moreover, a line sensor 106 implemented on a line sensor board 107 is arranged so as to face the imaging lens 105.

The original placed on the platen glass 101 is read by moving the optical box 102 along the arrow A in FIG. 1A.

That is, the lighting unit 103a emits light from an upstream side in an auxiliary scanning direction toward a reading position to irradiate the original. The lighting unit 103b emits light from a downstream side in the auxiliary scanning direction toward the original reading position to irradiate the original. Diffused light that is emitted from the lighting units 103a and 103b and reflected by the original enters into the line sensor 106 through an opening between the lighting units 103a and 103b, the folding mirrors 104a through 104e, and the image forming lens 105.

The original pressing plate 108 fixed to the back of the pressure plate 109 consists of a white tabular member. The pressure plate 109 presses the original to the platen glass 101 via the original pressing plate 108 by own weight of the pressure plate 109. A pressure-plate opening-closing flag 110 and a pressure-plate opening-closing sensor 111 that detects a state of the pressure-plate opening-closing flag 110 are provided on the platen so as to face one end of the pressure plate 109. The pressure-plate opening-closing sensor 111 detects the opening/closing state of the pressure plate 109 by detecting the pressure-plate opening-closing flag 110. The pressure-plate opening-closing sensor 111 is an opening-closing-detection unit that detects the opening/closing state of the pressure plate 109. Although the pressure-plate opening-closing flag 110 and the pressure-plate opening-closing sensor 111 are provided at a right end of the platen in FIG. 1A, they may be provided at a left end of the platen in FIG. 1A.

A principal-scanning original size index 112 and an auxiliary-scanning original size index 113 are respectively pasted at a left end and an upper end of the platen glass 101 in FIG. 1B.

In the description, the principal scanning direction is a width direction of the original along the principal-scanning original size index 112 in FIG. 1B, and is the same direction as longitudinal directions of the lighting units 103a and 103b that irradiate an original. Moreover, the auxiliary scanning direction intersects perpendicularly with the principal scanning direction, is a direction along the auxiliary-scanning original size index 113 in FIG. 1B, and intersects perpendicularly with the longitudinal directions of the lighting units 103a and 103b that irradiate an original.

A black triangle mark that indicates a home position 114 of an original placed on the platen glass 101 is provided on the principal-scanning original size index 112. An original is placed on the platen glass 101 so that a left upper corner of the original concerned coincides with the home position 114. A broken line in FIG. 1B shows an original reading position at a time of detection of an original size in the principal scanning direction, and is set at a position away from a left end of an original by a predetermined distance. For example, an A4-size original is placed on the platen glass 101 so that the upper left corner of the A4-size original concerned coincides with the home position 114, and the size in the principal scanning direction is detected at the original reading position 115.

Figure 2A:
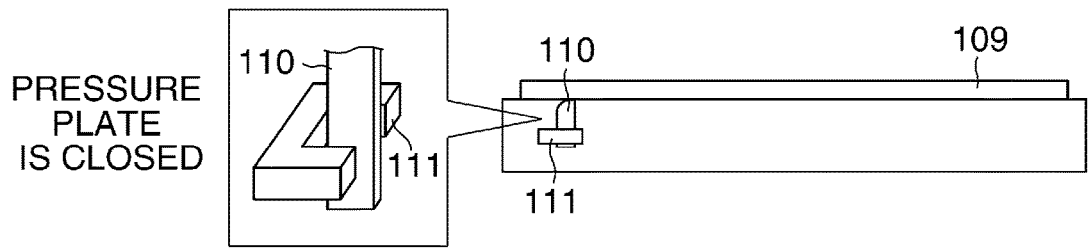
FIG. 2A and FIG. 2B are views for describing operations of a pressure-plate opening-closing flag in the image reading apparatus shown in FIG. 1A.
Figure 2B:
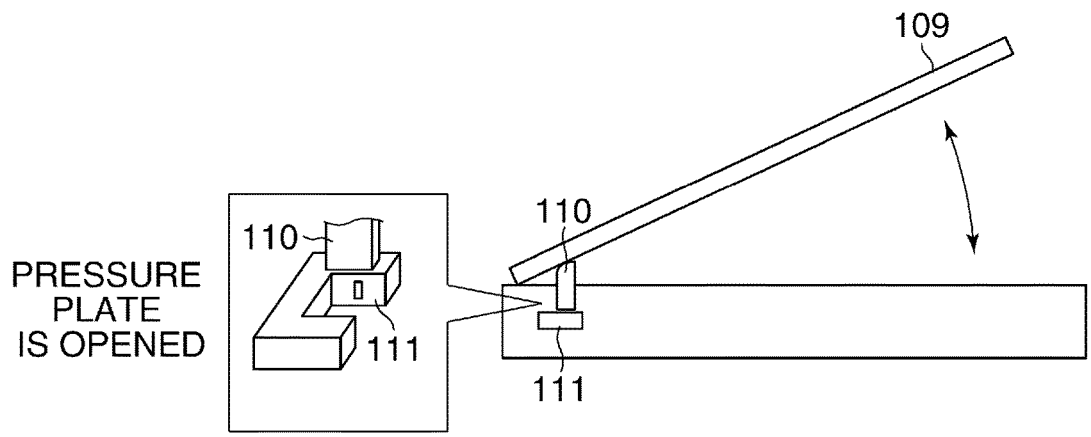

FIG. 2A and FIG. 2B are views for describing an operation of the pressure-plate opening-closing flag 110 in FIG. 1A. FIG. 2A shows a state where the pressure plate 109 is closed. FIG. 2B shows a state where the pressure plate 109 is opened.

In FIG. 2A, an elastic member (not shown), such as a spring, energizes the pressure-plate opening-closing flag 110 toward the pressure plate 109, and moves in a vertical direction in response to opening and closing of the pressure plate 109. That is, the pressure-plate opening-closing flag 110 moves downwardly when the pressure plate 109 is closed, and moves upwardly when the pressure plate 109 is opened.

The pressure-plate opening-closing sensor 111 is arranged around the pressure-plate opening-closing flag 110. The pressure-plate opening-closing sensor 111 consists of a photo interrupter, for example. When the pressure plate 109 is closed, the pressure-plate opening-closing flag 110 is pressed by the pressure plate 109, and intercepts an optical path of the pressure-plate opening-closing sensor 111 (FIG. 2A). Accordingly, the pressure-plate opening-closing sensor 111 detects the pressure-plate opening-closing flag 110, and outputs a High (H) level signal, for example.

On the other hand, when the pressure plate 109 is opened, the pressure-plate opening-closing flag 110 moves upward, the optical path of the pressure-plate opening-closing sensor 111 is connected, and light from a light emitting component is received by a light receiving component (FIG. 2B). As a result of this, the pressure-plate opening-closing sensor 111 outputs a Low (L) level signal, for example.

Since the pressure-plate opening-closing flag 110 and the pressure-plate opening-closing sensor 111 are configured as mentioned above, a desired angle of the pressure plate 109 is detectable by adjusting so that the optical path of the pressure-plate opening-closing sensor 111 is intercepted or connected when the pressure plate 109 is opened or closed to a predetermined angle. The predetermined angle falls in a range of 5 through 30 degrees, for example. Moreover, it is determined whether the pressure plate 109 was opened or closed by detecting a change direction of the signal level that the pressure-plate opening-closing sensor 111 outputs.

Next, a control system of the image reading apparatus 100 will be described.

Figure 3:
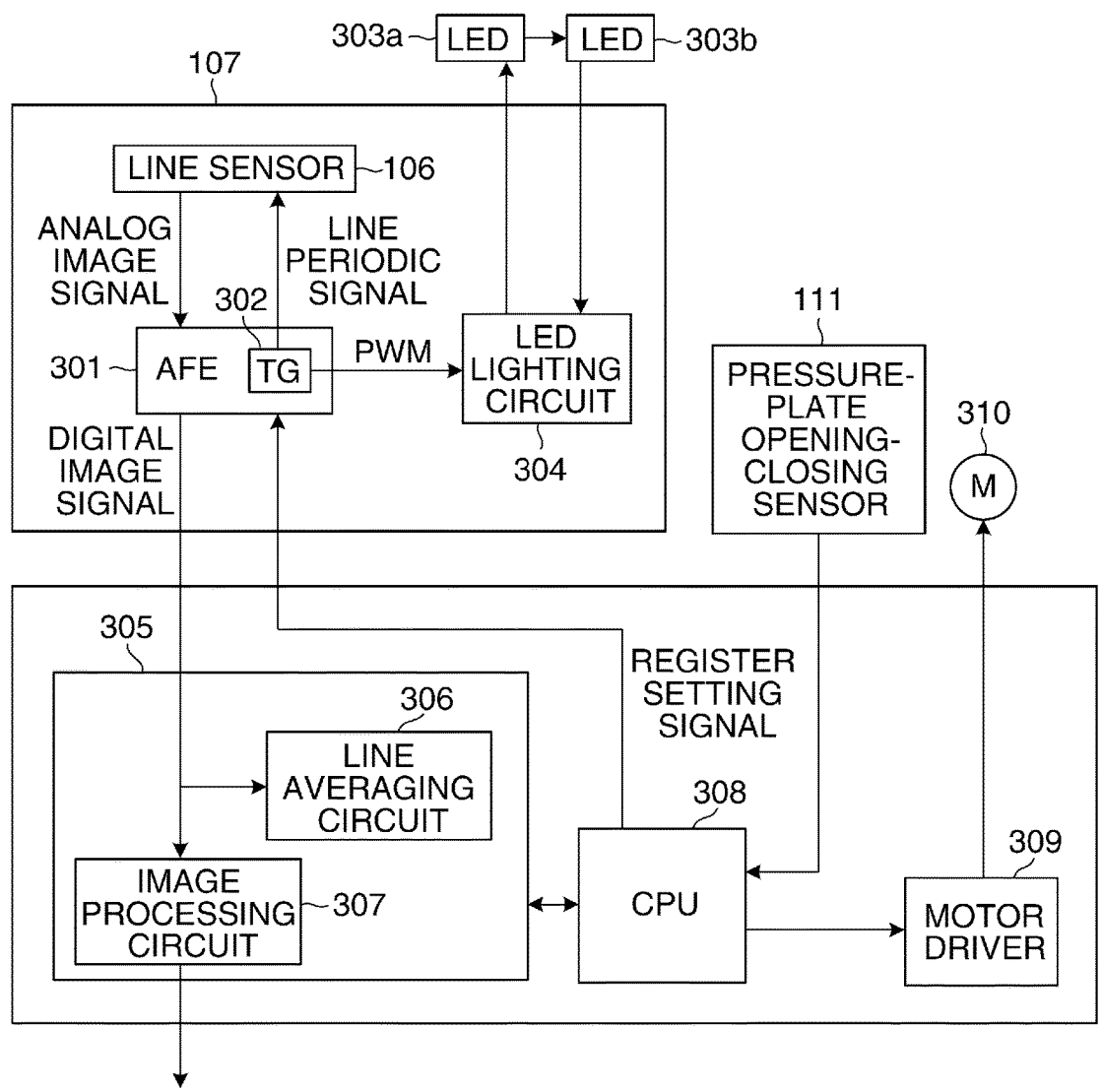
FIG. 3 is a block diagram schematically showing a control system of the image reading apparatus in FIG. 1A.

FIG. 3 is a block diagram schematically showing the control system of the image reading apparatus 100 in FIG. 1A.

As shown in FIG. 3, the image reading apparatus 100 is provided with a CPU 308. The CPU 308 is connected with a line averaging circuit 306 and an image-processing IC (image processing unit) 305 that includes an image processing circuit 307. The CPU 308 is connected with a pressure-plate opening-closing sensor 111 and a motor driver 309, and is connected with a motor 310 through the motor driver 309. The pressure-plate opening-closing sensor 111 is connected to an interruption input terminal of the CPU 308, for example.

The line sensor board 107 provided in the optical box 102 (see FIG. 1A) is provided with an analog-front-end IC (hereinafter referred to as "AFE") 301 equipped with a timing signal generating circuit (TG) 302. Moreover, the line sensor board 107 is provided with the line sensor 106 and an LED lighting circuit 304.

The AFE 301 is connected with the CPU 308. The AFE 301 is connected with the line averaging circuit 306 and the image processing circuit 307. The line sensor 106 is connected with the AFE 301 and the timing signal generating circuit (TG) 302 built in the AFE 301. The timing signal generating circuit (TG) 302 is connected with the LED lighting circuit 304, and is connected with an LEDs 303a and 303b, which are light sources of the lighting units 103a and 103b, through the LED lighting circuit 304.

The AFE 301 applies an offset correction process and a gain correcting process to the analog image signals that the line sensor 106 outputs, converts the processed signals into digital signals, and outputs the digital signals. Accordingly, the AFE 301 functions as an image conversion unit.

The timing signal generating circuit (TG) 302 outputs a PWM signal as a lighting control signal of LEDs 303a and 303b in synchronization with a line periodic signal. That is, the timing signal generating circuit 302 outputs a line sensor control signal including the line periodic signal to the line sensor 106. Moreover, the timing signal generating circuit 302 outputs the PWM signal for controlling lighting and lights-out of the LEDs 303a and 303b to the LED lighting circuit 304. The timing signal generating circuit 302 has a counter (not shown) that controls the period of the line periodic signal and a High (H)-term of the PWM signal within the period of the line periodic signal. The line periodic signal is generated on the basis of the period setting value of the line periodic signal that is set up by the CPU 308 and the count value of the counter. Duty ratio of the PWM signal is determined on the basis of a High (H)-term setting value of the PWM signal that is set up by the CPU 308 and the count value. The PWM signal keeps a H-level within a predetermined term, and varies to a Low (L)-level after the predetermined term elapses.

Although the timing signal generating circuit 302 is built in the AFE 301 in the first embodiment, the timing signal generating circuit 302 does not necessarily need to be built in the AFE 301, and can also be constituted as a single IC. Moreover, the timing signal generating circuit 302 may be built in the image-processing IC 305 that is mentioned later so as to supply a generated signal to the line sensor board 107.

The LED lighting circuit 304 supplies electric current to the LEDs 303a and 303b that are light sources of the lighting units 103a and 103b so that the lighting units 103a and 103b light.

The line averaging circuit 306 built in image-processing IC 305 obtains a predetermined number of line data, each of which includes digital image signals corresponding to the pixels of the line sensor 106, from the AFE 301, accumulates (adds) digital image signals of the line data for each pixel, and divides the accumulated signal by the predetermined number for each pixel. As a result, average values corresponding to the pixels are calculated as line average data. The image processing circuit 307 performs a shading correction process etc.

The CPU 308 controls the entire image reading apparatus 100. The CPU 308 outputs a control signal to the AFE 3016 to set up the period of the line periodic signal to the timing signal generating circuit 302 and to set up the duty ratio of the PWM signal. The CPU 308 is bus-connected with the image processing IC 305, for example. When detecting an original size in the principal scanning direction, the CPU 308 refers to the line average data, which the line averaging circuit 306 calculated, through a bus interface. The CPU 308 detects change of an output logic of the pressure-plate opening-closing sensor 111 to detect the opening/closing state of the pressure plate 109.

The motor driver 309 drives the motor 310 at predetermined excitation current and velocity according to the control signal that the CPU 308 outputs. The motor 310 moves the optical box 102 in the auxiliary scanning direction.

Next, an image reading process executed by the image reading apparatus 100 in FIG. 1A will be described.

Figure 4:
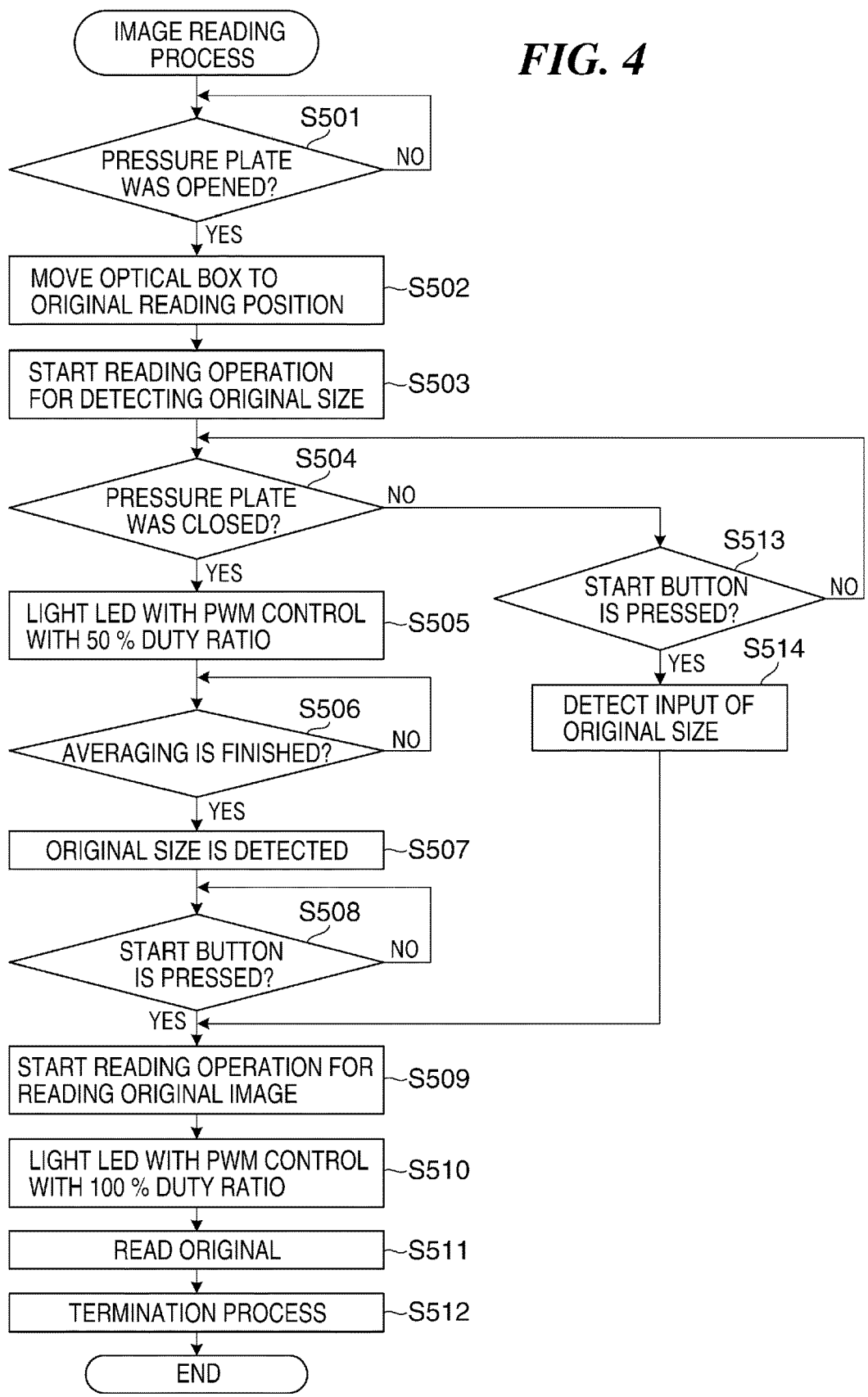
FIG. 4 is a flowchart showing an image reading process executed by the image reading apparatus in FIG. 1A.

FIG. 4 is a flowchart showing the image reading process executed by the image reading apparatus 100 in FIG. 1A. The CPU 308 of the image reading apparatus 100 performs this image reading process according to an image reading program stored in a ROM (not shown).

As shown in FIG. 4, when the image reading process is started, the CPU 308 determines first whether the pressure plate 109 was opened on the basis of the state of the pressure-plate opening-closing sensor 111, and waits until it is opened (step S501). In the state before starting the image reading process, the pressure plate 109 is closed, and the output of the pressure-plate opening-closing sensor 111 is in the H-level, for example. Accordingly, the CPU 308 waits until a user opens the pressure plate 109 and the output of the pressure-plate opening-closing sensor 111 varies from the H-level to the L-level in the step S501.

When the user opened the pressure plate 109 ("YES" in the step S501), the CPU 308 moves the optical box 102 to the original reading position 115 (step S502). Then, the CPU 308 controls the timing signal generating circuit 302 to output the line periodic signal for detecting the original size in the principal scanning direction. Next, the CPU 308 brings the line sensor 106 into a reading operation state for detecting the original size in the principal scanning direction, and starts a reading operation for detecting the original size in the principal scanning direction (step S503). At this time, the timing signal generating circuit 302 outputs a reading control signal to bring the line sensor 106 into the reading operation state. At this time, the timing signal generating circuit 302 outputs the line periodic signal for detecting the original size in the principal scanning direction to the line sensor 106 shown in FIG. 5B mentioned later.

Timing charts showing various signals and electric currents will be described.

Figure 5A:
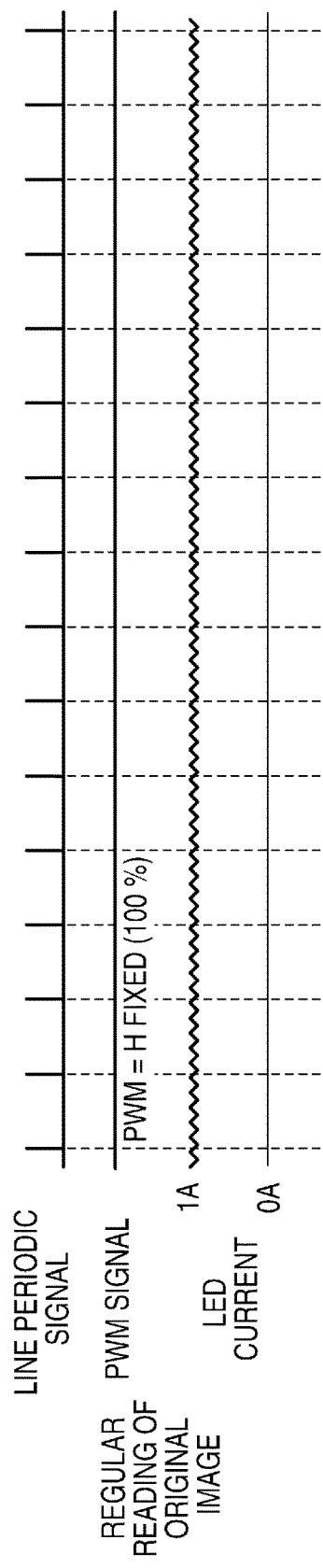
FIG. 5A and FIG. 5B are timing charts showing various signals and electric currents in the image reading apparatus in FIG. 1A.
Figure 5B:
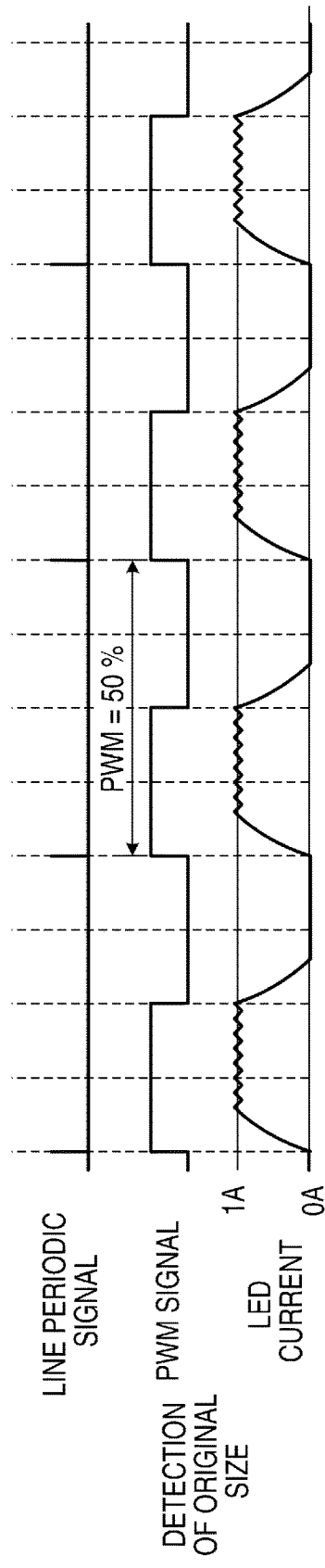

FIG. 5A and FIG. 5B are timing charts showing various signals and electric currents. FIG. 5A shows the timing chart at a time of regular reading of an original image. FIG. 5B shows the timing chart at a time of detection of an original size.

The timings of the line periodic signal, PWM signal, and electric current that flows into the LEDs 303a and 303b at the time of regular reading of an original image (FIG. 5A) are shown in contradistinction to that at the time of detection of an original size (FIG. 5B). The timing signal generating circuit 302 outputs the line periodic signal to the line sensor 106. Moreover, the timing signal generating circuit 302 outputs the PWM signal to the LED lighting circuit 304 in synchronization with the line periodic signal.

In FIG. 5A that shows the case of reading an original image regularly, the line periodic signal that sets up a period for reading an original image is output. The PWM signal is always High irrespective of the line periodic signal, and certain electric current (1 A (ampere), for example) is flowing through the LEDs 303a and 303b. On the other hand, in FIG. 5B that shows the case of detecting an original size, the duty ratio of the PWM signal is 50% and the current value varies according to the level (High or Low) of the PWM signal. When the PWM signal is High, the electric current of 1 A flows. When the PWM signal is Low, the supply of electric current stops and the electric current becomes 0 A. Followability of the electric current value to switching of the PWM signal (High to Low and Low to High) is low, and the electric current value varies gradually according to the change of the output level of the PWM signal. Since the electric current varies according to the PWM signal with the low followability, the average of the electric current that flows into the LEDs 303a and 303b becomes about 50% of that in FIG. 5A. As a result of this, the irradiation light amount felt by a person's eye will also be reduced to about 50%, which reduces glare that a user feels.

Moreover, a period of the line periodic signal in FIG. 5B is four times the period of the line periodic signal in FIG. 5A. If the line periodic signal in FIG. 5A is applied to the LED current according to the PWM signal in FIG. 5B, the LED current vary so as to rise, to be constant, to fall, and to turn off, corresponding to the line periodic signals. That is, since the LED current that flows within the period of the line periodic signal varies, the LED current amount differs for every line period signal, an accurate read original image is not obtained, and the original size in the principal scanning direction cannot be detected accurately.

Consequently, the period of the line periodic signal in FIG. 5B at the time for detecting an original size in the principal scanning direction is four times the period of the line periodic signal in FIG. 5A in the first embodiment. As a result of this, since the amount of the current that flows into the LEDs 303a and 303b (i.e., the irradiation light amount) becomes constant for every line periodic signal, the read image data for detecting the original size in the principal scanning direction is obtained stably.

Referring back to FIG. 4, after starting the reading operation for detecting the original size in the principal scanning direction (the step S503), the CPU 308 determines whether the user closed the pressure plate 109 from an opened state to the predetermined angle (for example, about 25 through 30 degrees) in step S504. At the time point in the step S503, since the pressure plate 109 is in the opened state, the output of the pressure-plate opening-closing sensor 111 is the Low level. Accordingly, when the user puts an original on the platen glass 101 and closes the pressure plate 109 until the output of the pressure-plate opening-closing sensor 111 is switched from the Low level to the High level, the determination result in the step S504 becomes "YES".

As a result of the determination in the step S504, the user closed the pressure plate 109 ("YES" in the step S504), the CPU 308 lights the LEDs 303a and 303b in the duty ratio of detecting an original size (step S505).

At this time, the timing signal generating circuit 302 outputs the PWM signal to the LED lighting circuit 304 to light the LEDs 303a and 303b. The duty ratio of the PWM signal that the timing signal generating circuit 302 outputs is 50%, for example.

After lighting the LEDs 303a and 303b (the step S505), the CPU 308 controls the line averaging circuit 306 to accumulate image signals included in the predetermined number of line data sent from the AFE 301 for each pixel and to average by dividing the accumulated signal by the predetermined number (the number of averaged lines) for each pixel, and waits until the averaging is completed (step S506). The line averaging process that averages the image signals is performed to remove a noise component. Since time required for the line averaging process is estimated on the basis of the period of the line periodic signal and the number of averaged lines, the completion of the line averaging process may be determined when predetermined time elapses from the start of the line averaging process.

After the averaging of the image signals is completed (YES in the step S506), the CPU 308 detects the original size in the principal scanning direction (step S507). At this time, the CPU 308 detects the original size in the principal scanning direction by referring to the line average data obtained in the step S506. Specifically, the CPU 308 refers to the image signals averaged by the line averaging unit 306 in order from a head pixel toward an end pixel in the principal scanning direction, and determines a position of a pixel of which an image signal is less than a predetermined threshold as the end of the original in the principal scanning direction.

For example, when an A4 original is placed on the platen glass 101 as shown in FIG. 1B, the image signals output from the line sensor 106 are significant in the area of the A4 original in the principal scanning direction because there is diffused reflection light from the original.

On the other hand, the output level of the image signals output from the line sensor 106 becomes zero in the areas outside the A4-original because there is no original and no diffused reflection light from the original. Accordingly, the end position of the A4 original in the principal scanning direction is detectable by comparing the image signals from the line averaging circuit 306 with the threshold that is suitably set. The detected end position in the principal scanning direction corresponds to the end position of the original on the original reading position 115 (broken line) in FIG. 1B. In the first embodiment, an original is placed on the platen glass 101 using the home position 114 as a reference.

That is, the end of the original at the far side of the platen glass is brought into contact with the auxiliary-scanning original size index 113. Accordingly, the detected end of the original in the principal scanning direction corresponds to the end of the original at the near side of the original glass. Then, the original size in the principal scanning direction is found from the end position of the original concerned.

After detecting the original size in the principal scanning direction (the step S507), the CPU 308 determines whether the user pushed a start button, such as a copy start button, and waits until the user pushes (step S508). After the start button was pressed ("YES" in the step S508), the CPU 308 proceeds with the process to step S509. That is, the CPU 308 brings the line sensor 106 into an original-image reading state, and starts a reading operation of an original image (step S509). At this time, the line periodic signal that the timing signal generating circuit 302 outputs to the line sensor 106 is switched from the signal in FIG. 5B for detecting an original size to the line periodic signal in FIG. 5A for reading an original image.

Next, the CPU 308 lights the LEDs 303a and 303b at the 100% duty ratio for reading an original image (step S510). At this time, the PWM signal that the timing signal generating circuit 302 outputs to the LED lighting circuit 304 is switched from the signal with the 50% duty ratio in FIG. 5B for detecting an original size to the signal with the 100% duty ratio in FIG. 5A for reading of an original image.

Next, the CPU 308 controls the LED lighting circuit 304, the line sensor 106, etc. to read an original image (step S511). At this time, the CPU 308 controls the motor driver 309 to start the motor 310 so as to move the optical box 102 from the head to the end in the auxiliary scanning direction to read the entire image of the original placed on the platen glass 101.

After reading of the original image is completed (the step S511), the CPU 308 performs a termination process (step S512), and finishes this process. In the termination process, the CPU 308 controls the timing signal generating circuit 302 to stop the line periodic signal and PWM signal that were output by the timing signal generating circuit 302 in order to finish the reading operation.

On the other hand, as a result of the determination in the step S504, when the pressure plate 109 is not closed ("NO" in the step S504), the CPU 308 determines whether the user pressed the start button, i.e., the copy start button, for example (step S513). As a result of the determination in the step S513, when the user pressed the start button ("YES" in the step S513), the CPU 308 proceeds with the process to step S514. That is, the CPU 308 waits until the user inputs an original size (step S514), and proceeds with the process to the step S509.

Since the pressure plate 109 has been opened and the original size in the principal scanning direction has not yet detected in the step S514, the size of the original on the platen glass 101 has not become clear in this time point. Accordingly, the CPU 308 waits until the user inputs the original size through an operation panel (not shown), for example, and then starts the image reading process. On the other hand, when the user does not press the start button, i.e., the copy start button ("NO" in the step S513), the CPU 308 returns the process to the step S504.

According to the process in FIG. 4, when the original size in the principal scanning direction is detected, the period of the line periodic signal of the line sensor 106 is made longer than that at the time of regular reading of an original image, and the PWM signal that lights the LEDs 303a and 303b is output in synchronization with the line periodic signal (step S503).

The duty ratio of the PWM signal at the time of detection of an original size in the principal scanning direction is smaller than the duty ratio at the time of regular reading of an original image, and is 50%, for example (the step S505). This reduces glare that the user feels. Furthermore, since the period of the line periodic signal is longer than the line periodic signal at the time of regular reading of an original image, the amount of the electric current flowing into the LED (i.e., the irradiation light amount) at the time of detection becomes constant even when the LED is lighted by the 50% duty ratio that switches ON and OFF within one period of the line periodic signal. Accordingly, the original size in the principal scanning direction is detectable with sufficient accuracy.

In the first embodiment, the period of the line periodic signal at the time of detection of an original size is four times the period of the line periodic signal at the time of regular reading of an original image, and the duty ratio of the PWM signal at the time of detection of an original size is 50% of that at the time of regular reading of an original image. However, the magnification of the period of the line periodic signal and the duty ratio of the PWM signal are not limited to the above-mentioned examples, and may be changed within limits that attain the desired results.

In the first embodiment, the read image signals of the same pixel of the line sensor 106 in the predetermined number of lines are averaged for each pixel when an original size is detected (step S506). This removes a noise component and enables to detect the length of the original in the principal scanning direction correctly.

Next, a second embodiment of the present invention will be described. A hardware structure of an image reading apparatus according to the second embodiment is the same as the hardware structure of the image reading apparatus according to the first embodiment mentioned above, and only control systems differ. Hereinafter, the second embodiment will be described focusing on different points from the first embodiment.

Figure 6:
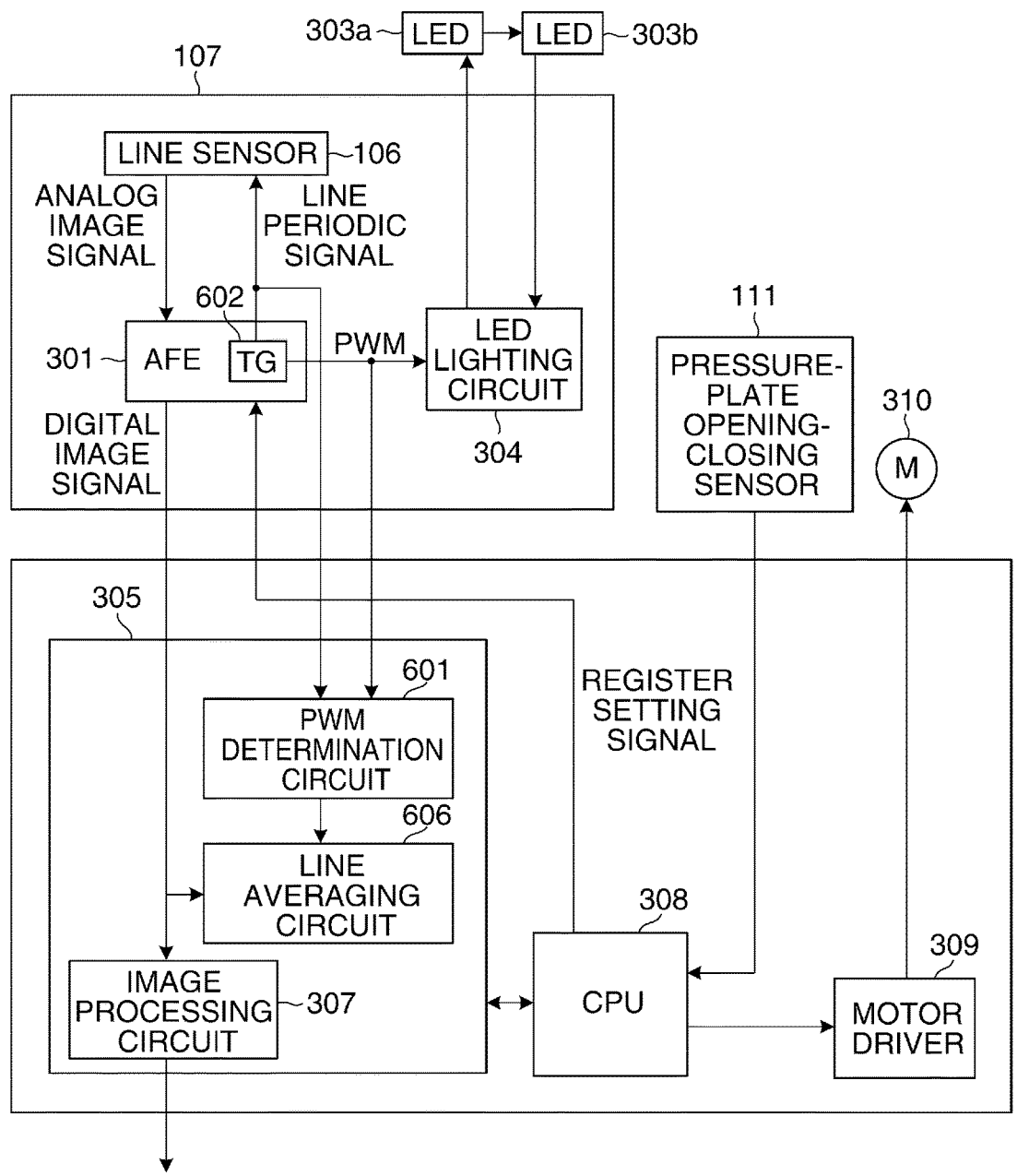
FIG. 6 is a block diagram schematically showing a control system of an image reading apparatus according to a second embodiment.

FIG. 6 is a block diagram schematically showing a control system of the image reading apparatus according to the second embodiment. The same reference numeral as the reference numeral used in FIG. 3 is attached to a block in FIG. 6 that has the same function as a block in FIG. 3, and a detailed description about the block concerned is omitted.

As shown in FIG. 6, the image reading apparatus according to the second embodiment differs from the image reading apparatus according to the first embodiment at a point that the image-processing IC 305 is provided with a PWM determination circuit 601. A timing signal generating circuit (TG) 602 outputs the line sensor control signal including the line periodic signal to the line sensor 106 and outputs the PWM signal to the LED lighting circuit 304 in the same manner as the timing signal generating circuit 302 in FIG. 3. The PWM determination circuit 601 is connected with an output line from the timing signal generating circuit 602 to the line sensor 106, and with an output line reached from the timing signal generating circuit 602 to the LED lighting circuit 304.

The line periodic signal and the PWM signal that the timing signal generating circuit 602 outputs are inputted into the PWM determination circuit 601. The PWM determination circuit 601 determines an output logic level of the PWM signal within the period of the line periodic signal.

Moreover, the PWM determination circuit 601 is connected with the line averaging circuit 306. That is, the PWM determination circuit 601 determines whether the PWM signal reached a predetermined level (High level) within the period of the line periodic signal. When it is determined that the PWM signal reached the predetermined level (High level), the PWM determination circuit 601 outputs an addition permission signal to the line averaging circuit 606. That is, the PWM determination circuit 601 functions as a signal determination unit.

Although the line averaging circuit 606 has the same function as the line averaging circuit 306 in FIG. 3, it is connected with the PWM determination circuit 601. Only when receiving the addition permission signal that the PWM determination circuit 601 outputs, the line averaging circuit 606 averages the digital image signals that the AFE 301 outputs. The line averaging circuit 606 uses the image signals that the AFE 301 outputs in the period of the line periodic signal following the period in which the PWM determination circuit 601 outputted the addition permission signal. Then, the length of an original in the principal scanning direction is detected using the averaged image signals.

The timing signal generating circuit 602 is provided with a first counter (not shown) for controlling the period of the line periodic signal and a second counter (not shown) for controlling start and end of the High period (lighting period) of the PWM signal.

As mentioned later, since the High period of the PWM signal is set up to be longer than the period of the line periodic signal in the second embodiment, the number of digits of the second counter for the PWM signal is more than that of the first counter for the line periodic signal. Moreover, the second counter for the PWM signal is reset to zero when the predetermined number of the line periodic signals are counted. The PWM signal will be output in synchronization with the predetermined number of the line periodic signals.

Hereinafter, an image reading process using the image reading apparatus according to the second embodiment will be described.

Figure 7:
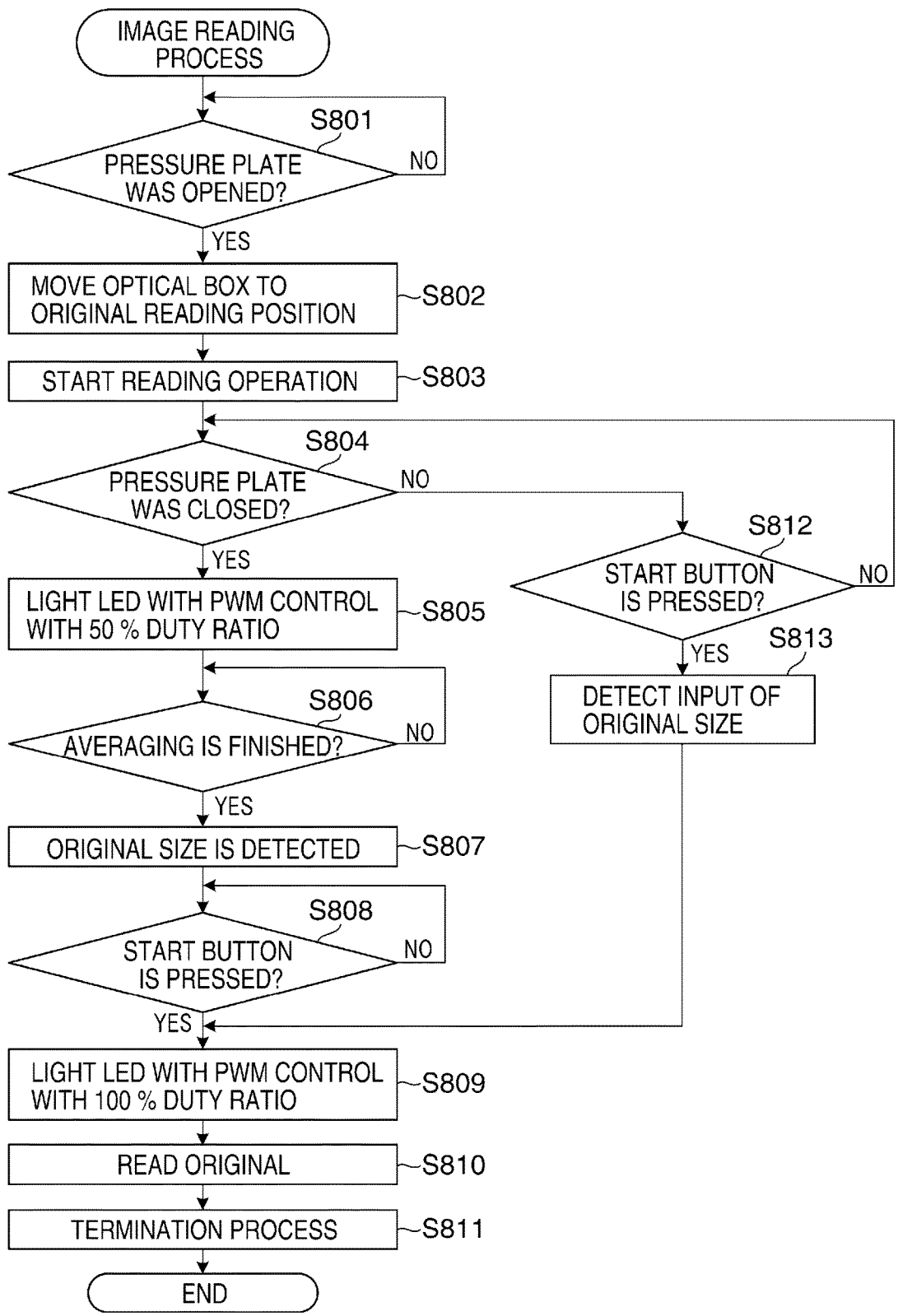
FIG. 7 is a flowchart showing an image reading process executed by the image reading apparatus according to the second embodiment.

FIG. 7 is a flowchart showing the image reading process executed by the image reading apparatus according to the second embodiment. The CPU 308 in FIG. 6 performs this image reading process according to an image reading program stored in a ROM (not shown).

Although the procedure of the image reading process shown in FIG. 7 is almost the same as the procedure of the image reading process of the first embodiment shown in FIG. 4, an output method of the line periodic signal after moving the optical box 102 to the original reading position in step S802 differs.

Namely, the period of the line periodic signal at the time of detection of an original size output in the step S503 in FIG. 4 is longer than the period of the line periodic signal at the time of regular reading of an original image. In the second embodiment, the period of the periodic signal at the time of detection of an original size is not different from that at the time of regular reading of an original image. Accordingly, the line periodic signal at the time of detection of an original size is the same as that at the time of regular reading of an original image (step S803).

Moreover, the line periodic signal was switched from the signal for detecting an original size to the signal for reading an original image in the step S509 after the start button (copy start button) was pressed (step S508) in FIG. 4. In the second embodiment, this step becomes unnecessary. That is, in the second embodiment, since the period of the line periodic signal at the time of regular reading of an original image is not changed at the time of detection of an original size, a step equivalent to the step S509 in FIG. 4 becomes unnecessary. The other steps are the same as that of the first embodiment in FIG. 4.

Hereinafter, timing charts showing various signals and electric currents in the second embodiment will be described.

FIG. 8A and FIG. 8B are timing charts showing various signals and electric currents in the second embodiment. FIG. 8A shows the timing chart at the time of regular reading of an original image. FIG. 8B shows the timing chart at the time of detection of an original size. It should be noted that FIG. 8A is the same as FIG. 5A.

The timings of the line periodic signal, PWM signal, and electric current that flows into the LEDs 303a and 303b at the time of regular reading of an original image (FIG. 8A) are shown in contradistinction to that at the time of detection of an original size (FIG. 8B). The timing signal generating circuit 602 outputs the line periodic signal to the line sensor 106. Moreover, the timing signal generating circuit 602 outputs the PWM signal to the LED lighting circuit 304.

In FIG. 8B showing the time of detection of an original size, the period of the line periodic signal is the same as that of the line periodic signal in FIG. 8A showing the time of regular reading of an original image. The duty ratio of the PWM signal is 50%, and one period of the PWM signal synchronizes with four periods of the line periodic signal. In the description, the four periods of the line periodic signal included in one period of the PWM signal are defined as a first period P1, second period P2, third period P3, and fourth period P4. The PWM signal rises in the first period P1 of the line periodic signal and keeps the High level over the second period P2. Then, the PWM signal falls in the third period P3e and keeps an off state over the fourth period P4. Accordingly, the LED current gradually rises in the first period P1. and the state where the electric current of 1 A flows into the LEDs 303a and 303b is produced in the second period. Moreover, the LED current gradually falls in the third period, and keeps 0 A over the fourth period. The PWM determination circuit 601 outputs the addition permission signal within the second period P2 of the line periodic signal. Moreover, if the LED current falls immediately after shifting to the third period P3, extension of the output period of the addition permission signal due to some reason may reduce the output signals from the line sensor at the time of detection of an original size. Accordingly, the start and end of the H-level (lighting) period of the PWM signal is delayed with respect to the line periodic signal so as not to reduce the output signals of the line sensor even in such a case.

At the time of detecting an original size (FIG. 8B), the PWM determination circuit 601 that has received the PWM signal outputs the addition permissible signal to the line averaging circuit 606 every four periods of the line periodic signal. The line averaging circuit 606 obtains image data and performs the averaging process every four periods of the line periodic signal.

According to the process in FIG. 7, when the original size in the principal scanning direction is detected (the step S802), the PWM signal with the 50% duty ratio that lights the LEDs as the light sources is output in synchronization with a plurality of periods of the line periodic signal (step S805). Then, the PWM determination circuit 601 recognizes the period of the line periodic signal where the electric current that flows into the LEDs is constant. When recognizing the period of the line periodic signal where the electric current that flows into the LEDs is constant, the PWM determination circuit 601 outputs the addition permission signal (FIG. 8B), the obtained image signals are averaged (step S806), and the original size in the principal scanning direction is detected (step S807).

This reduces the glare that the user feels by reducing the duty ratio of the PWM signal rather than that at the time of reading of an original image. Moreover, when the period of the line periodic signal where the electric current that flows into the LEDs is constant is recognized, the original size in the principal scanning direction is detected by averaging the image signals. Accordingly, a light source lighting condition that is required for detecting the original size in the principal scanning direction is ensured, and the original size is detected stably.

Although the duty ratio of the PWM signal is 50% as compared with the duty ratio at the time of reading of an original image and one period of the PWM signal is output in synchronization with the four periods of the line periodic signal in the above-mentioned embodiments, the present invention is not limited to this. Namely, the duty ratio of the PWM signal and the ratio of the period the PWM signal to the period of the line periodic signal may be changed as long as the initial object is achieved.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-098040, filed May 16, 2016, which is hereby incorporated by reference herein in its entirety.

What is claimed is:
1. An image reading apparatus comprising:
an opening-closing detection unit configured to detect an opening/closing state of a pressure plate that presses an original to a platen;
a light source that irradiates the original placed on the platen with light;
a line sensor configured to receive light reflected by the original at a reading position, and to output image signals;
a timing signal generating circuit configured to output a line periodic signal to the line sensor and to output a lighting control signal that is supplied to the light source in synchronization with the line periodic signal supplied to the line sensor; and
a controller configured to detect the length of the original in a predetermined direction that is perpendicular to a moving direction of the reading position based on the image signals output from the line sensor,
wherein the timing signal generating circuit is configured to output a first line periodic signal having a period longer than a period of a second line periodic signal at a time of reading an original image to the line sensor, and to output a first lighting control signal having a first duty ratio smaller than a second duty ratio at the time of reading the original image to the light source, in accordance with the opening-closing detection unit detecting the closing state, from the opening state, corresponding to a predetermined angle, and wherein the first duty ratio relates to a ratio of a period during which the light source is lit during the period of the first line periodic signal.

2. The image reading apparatus according to claim 1, further comprising:
   a line averaging circuit configured to average the image signals output from the line sensor, and
   wherein the controller detects the length of the original in the predetermined direction using an image signal averaged by the line averaging circuit.

3. The image reading apparatus according to claim 2, further comprising an image processing unit that contains the line averaging circuit.

4. The image reading apparatus according to claim 1, wherein the first duty ratio of the lighting control signal is determined using a term setting value of the first lighting control signal.

5. The image reading apparatus according to claim 1, further comprising:
   an analog-front-end IC configured to convert analog image signals output from light sensor into digital image signals, and
   wherein analog-front-end IC includes the timing signal generating circuit.

6. An image forming apparatus comprising:
   an image reading apparatus comprising:
      an opening-closing detection unit configured to detect an opening/closing state of a pressure plate that presses an original to a platen;
      a light source that irradiates the original placed on the platen with light;
      a line sensor configured to receive light reflected by the original at a reading position, and to output image signals;
      a timing signal generating circuit configured to output a line periodic signal to the line sensor and to output a lighting control signal that is supplied to the light source in synchronization with the line periodic signal supplied to the line sensor;
      a controller configured to detect the length of the original in a predetermined direction that is perpendicular to a moving direction of the reading position based on the image signals output from the line sensor,
      wherein the timing signal generating circuit is configured to output a first line periodic signal having a period longer than a period of a second line periodic signal at a time of reading an original image to the line sensor, and to output a first lighting control signal having a first duty ratio smaller than a second duty ratio at the time of reading the original image to the light source, in accordance with the opening-closing detection unit detecting the closing state, from the opening state, corresponding to a predetermined angle, and
      wherein the first duty ratio relates to a ratio of a period during which the light source is lit during the period of the first line period signal; and
   a printer configured to print the image read by the image reading apparatus.

* * * * *